United States Patent [19]

Geiermann et al.

[11] Patent Number: 5,714,730
[45] Date of Patent: Feb. 3, 1998

[54] WELDING GUN FOR PROJECTION WELDING

[75] Inventors: Thomas J. Geiermann; Ronald A. Derdowski, both of Bay City; Randy E. Smith, Frankenmuth, all of Mich.

[73] Assignee: Newcor, Inc., Bloomfield Hills, Mich.

[21] Appl. No.: 734,484

[22] Filed: Oct. 21, 1996

[51] Int. Cl.$^6$ .............................. B23K 9/32; B23K 9/00
[52] U.S. Cl. .................................. 219/86.25; 219/98
[58] Field of Search ........................... 219/86.25, 98, 219/119

[56] References Cited

U.S. PATENT DOCUMENTS

| | | |
|---|---|---|
| 2,255,652 | 9/1941 | Dawson et al. |
| 3,398,255 | 8/1968 | Aldenhoff |
| 3,445,620 | 5/1969 | Littwin et al. |
| 3,632,958 | 1/1972 | Width |
| 4,282,417 | 8/1981 | Jurek |
| 4,417,122 | 11/1983 | Thorne |
| 4,831,228 | 5/1989 | Schumacher ........... 219/86.22 |
| 5,277,353 | 1/1994 | Budig et al. ............. 219/98 |

FOREIGN PATENT DOCUMENTS 1 207 696   10/1970   United Kingdom.

OTHER PUBLICATIONS

Materials Joining Tech Briefs, Brief #2, Body Materials Engineering, Sep. 1994, published by Materials Engineering's Materials Joining Laboratory (2 pages).
Materials Joining Tech Briefs, Brief #3, Body Materials Engineering, Oct. 1994, published by Materials Engineering's Materials Joining Laboratory (2 pages).
Materials Joining Tech Briefs, Brief #4, Body Materials Engineering, Nov. 1994, published by Materials Engineering's Materials Joining Laboratory (2 pages).

Brochure entitled "HY-Pak™ Solutions", Newcor, Bay City Division, Apr. 1991 (6 pages), and Hy-Pak Welding enclosure sheets (29 pages).

"Solutions Through Proprietary Welding Technology", Innovative Manufacturing Systems, Apr. 1991, (4 pages).

"Stamping the Ram", by Lindsay Brooke, Reprinted from Automotive Industries Sep. 1993 issue, Furnished by Bay City Division, Newcor, Inc. (2 pages).

Primary Examiner—Stuart N. Hecker
Attorney, Agent, or Firm—Flynn, Thiel, Boutell & Tanis, P.C.

[57] ABSTRACT

A welding head for projection welding wherein the spring which biases the electrode is initially preloaded to exert a significant biasing force on the electrode to maintain it against a stop to define the normal fully extended position of the electrode. The spring of the welding head is also initially precalibrated to exert an accurate predetermined biasing force on the electrode when the electrode is depressed inwardly so as to effect compression of the spring by a predetermined distance, which latter distance is of very small magnitude. The welding head is disposed in engagement with overlapping sheets so that the electrode is engaged with the sheets in alignment with a projection thereon, and the electrode is depressed through said predetermined distance so that a uniform predetermined biasing force is applied to the electrode and hence to the projection weld area.

19 Claims, 10 Drawing Sheets

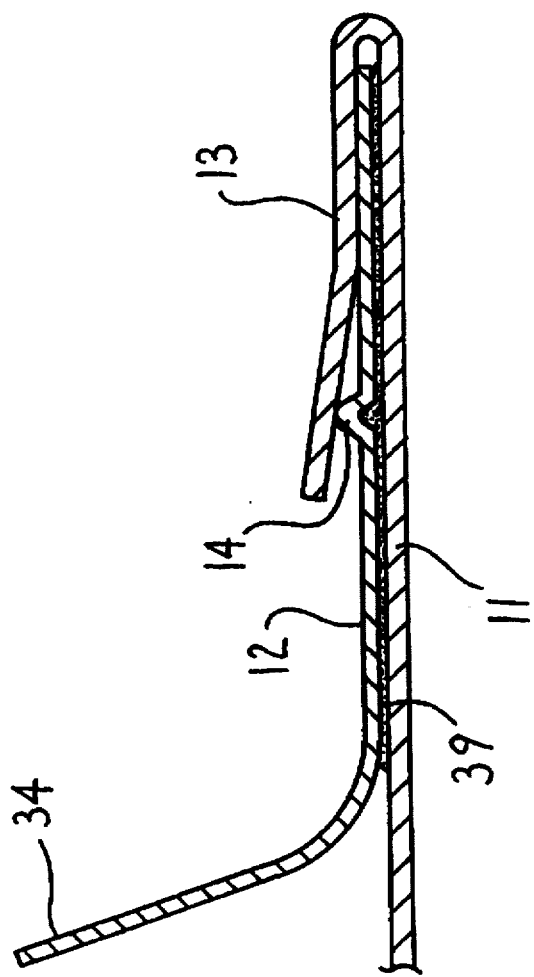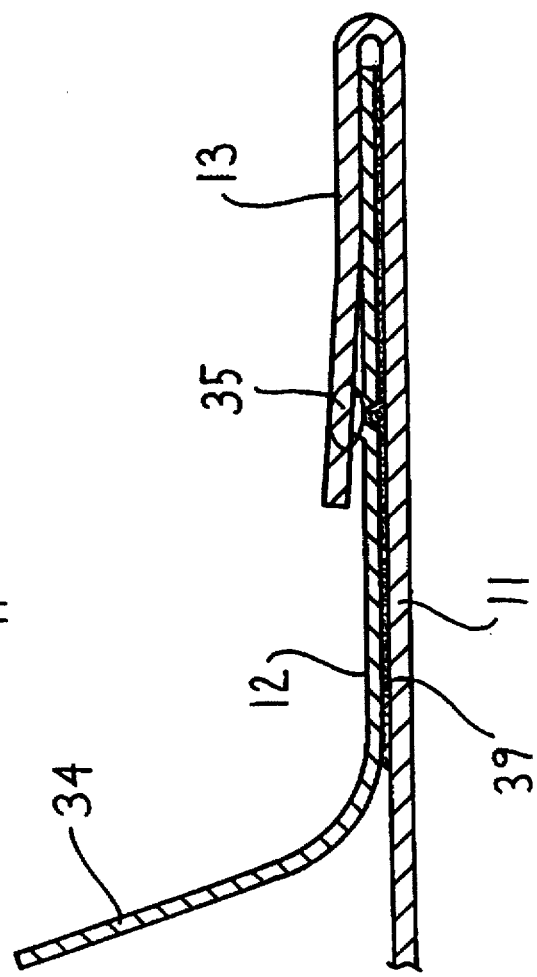

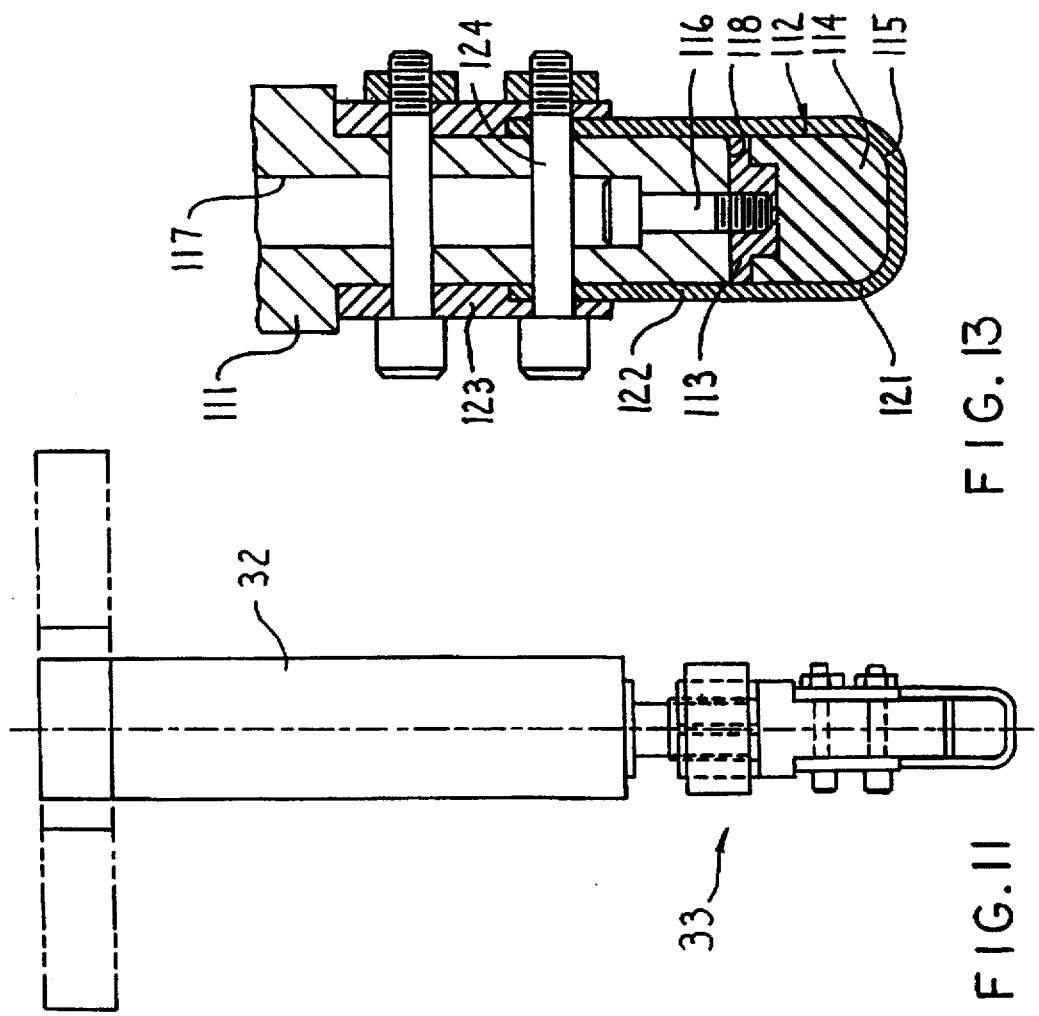
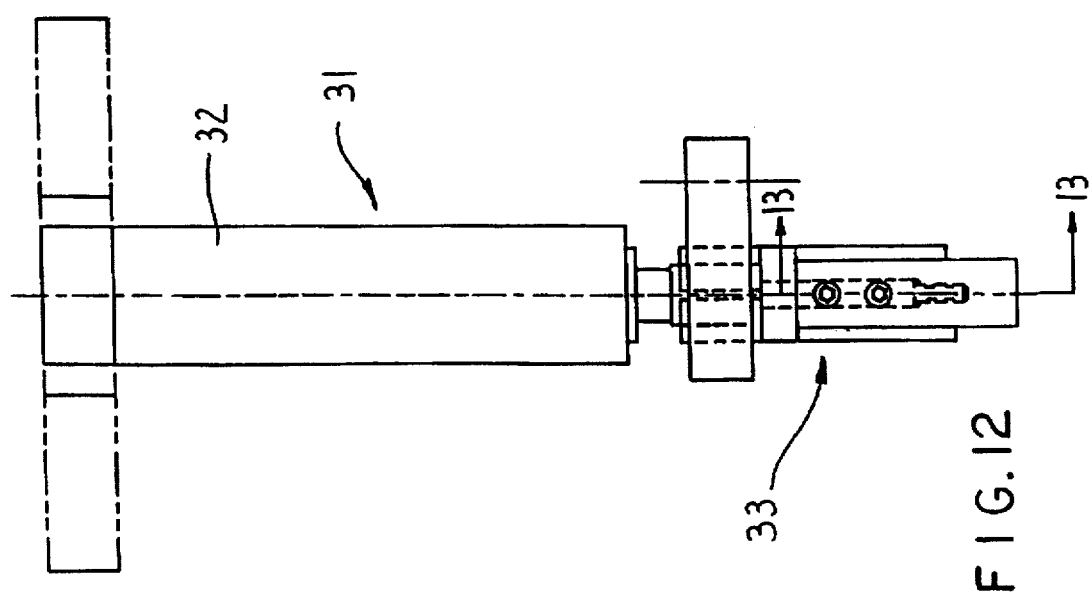

WELDING GUN FOR PROJECTION WELDING

FIELD OF THE INVENTION

This invention relates to a projection welding arrangement and, more specifically, to an improved welding gun particularly for projection hem welding.

BACKGROUND OF THE INVENTION

Projection welding is a known technique for permitting a weld-type securement between two thin overlapping metal sheets. In projection welding, one of the sheets is provided with a small projection extending transversely therefrom, with the tip of the projection being maintained in contact with the other overlapping sheet. The electrode of a welding gun is pressed into contact with the other sheet, generally in alignment with the projection, and a combination of force and electric current is applied to the electrode to effect welding together of the two sheets at the contact area defined by the projection, and to collapse the projection to thereby effect a weld nugget for securing the overlapping sheets together.

In the known projection welding technique, during a single projection welding operation, it has been conventional to apply alternating electrical current to the contact electrode over a fairly long time period, whereby several cycles of AC current are applied to the electrode to permit performance of a single projection weld. This long current application time, and the difficulty in achieving the desired contact force and collapsing of the heated projection, have often resulted in disadvantages which have made projection welding less than desired for use on thin gauge metal sheets. For example, difficulties have often been observed with respect to marking or discoloration of the sheet surface, or if the sheets are coated, then damage to the coating often results. For these and other reasons, projection welding has previously not met with a high level of acceptance for use on thin metal sheets, although more recently a greater acceptance is being achieved.

In this regard, U.S. Pat. No. 4 417 122 as owned by the Assignee hereof relates to an improved projection welding arrangement wherein a low-inertia fast-response welding gun is provided for effecting contact with and projection welding between two overlapping light-gauge metal sheets. With the arrangement of the aforesaid patent, not only is there provided a welding gun having a low-inertia and hence fast response electrode, but more significantly the electrical current is applied to the electrode for only an extremely short time duration, which duration is only a fraction of one-half of a typical alternating current wave cycle. In this manner, a very high energy pulse of current, of very short time duration, is transmitted to the moving welding head and applied to the projection contact area between the overlapping sheets to thereby effect rapid and efficient welding of the sheets together. The system of this '122 patent has been able to provide a desirable weld nugget between the overlapping sheets without causing any significant heat-effected zone, and without causing excessive discoloration or marking of the sheets. Hence, the arrangement of this aforesaid patent has in recent years become more accepted for projection welding, particularly for hem-type projection welding such as is conventionally utilized for securing thin gauge sheets as associated with automobiles and the like.

Referring to FIGS. 1-3, there is illustrated a known arrangement for effecting projection hem welding, which arrangement incorporates therein the improved projection welding arrangement and specifically the improved welding head of the aforementioned '122 patent. This welding arrangement 10 is particularly desirable for projection welding of thin sheetlike metal components disposed in overlapping relation, typically light gauge metal sheets which commonly have a thickness in the range of 0.020 to 0.050 inch. The thin workpieces or sheets to be welded are illustrated at 11 and 12, which sheets have portions which directly overlap as shown in FIG. 1, and in a hem welding process one of the sheets 11 also has a flange or hem part 13 which is bent upwardly to overlap the remote side of the other sheet 12, whereby the sheet 12 is sandwiched between the sheet 11 and its hem part 13. The intermediate sheet 12 also is provided with a bead or projection 14 formed therein and projecting transversely therefrom so that the tip of the projection contacts the inner (i.e. lower) surface of the hem part 13. In this hem type arrangement, a projection weld is created directly between the sheet 12 and the hem part 13 at the region of the projection 14.

In this known projection welding arrangement 10 the overlapping sheets (i.e., the workpieces) are typically positioned on a backup support or die 15, and a movable welding head assembly 17 is positioned adjacent the die 15 so as to cooperate with the overlapping sheets to permit creation of the projection weld. The movable welding head assembly 17 includes a hollow housing or body 18 having an electrode 19 movably supported therein and projecting outwardly for contact with the overlapping sheets in the region of the projection, and a spring 21 (typically a coil spring) is confined within the housing and acts against an inner face of the electrode 19 so as to urge the electrode 19 outwardly into an extended position, in which position the electrode abuts an interior stop surface formed on the housing. The movable welding head assembly 17 is electrically connected to a stationary transformer 22. The power supply to the transformer 22, and hence the welding current supplied thereto to the welding head assembly, is in turn controlled by a suitable control unit 23. The transformer 22 has the primary coils 24 thereof connected to suitable electrical leads or conductors 25 and 26, which conductors typically have a conventional 460 volt, single phase, 60 hertz power supply connected thereto. The secondary coils 27 of the transformer are in turn connected to suitable conductors 28 and 29, one of which is connected to the welding head assembly 17 and the other of which is connected on a downstream side of the sandwiched workpieces, such as by being connected either to the die 15 or in a hem welding process being connected to an electrical contact gun 31 as illustrated in FIG. 1. This contact gun 31 includes a support 32 such as a conventional double-piston double-acting pressure cylinder, normally an air cylinder, having a conventional electrode 33 movably supported thereon, the latter being positioned for engagement with a part 34 of the intermediate sheet 12, which part 34 where it engages the electrode 33 being spaced from the overlapping or sandwiched portions of the sheets and also being spaced from the sheet 11. The conductors 28 and 29 are typically constructed as conventional flexible laminations so as to permit movements of the welding head assembly 17 and contact head assembly 31 relative to the transformer 22.

The welding arrangement also includes a drive device 36 for effecting movement of the welding head assembly 17. This drive device typically constitutes a pneumatic cylinder having a housing 37 which is typically stationary mounted, and provided with an extendible and contractible piston rod 38 which in turn couples to the housing 18 of the welding head assembly 17 to control the movement of the assembly 17 into engagement with the sheets when a projection welding operation is to be carried out.

In a typical welding operation, the drive 36 is energized and moves the head assembly 17 downwardly to cause the electrode 19 to engage the sheet part 13 adjacent or substantially in alignment with the projection 14, with the downward movement being sufficient to cause an inward depression of the electrode 19 and hence a compression of the spring 21. The control unit 23 then supplies a very short duration, unipolar, high energy electrical current pulse to the electrode 19 which effects heating of the projection 14 and of the sheet part 13 in the immediate vicinity of the projection. This, coupled with the pressure imposed on the electrode by the spring 21, effects collapsing of the heated projection to thereby create a weld bead or nugget 35 between the sheet parts 12 and 13 substantially as illustrated in FIG. 3.

When carrying out a hem welding operation, typically for effecting spot welding of an outer automotive body sheet 11 to an inner support sheet 12, the overlapping edge portions of the sheets 11 and 12 typically have an adhesive 39 provided therebetween, but this adhesive is not effective for fixedly securing the sheets 11 and 12 together until subjected to high temperatures such as experienced in a paint drying oven. Accordingly, the projection weld is provided so as to at least temporarily fixedly join the sheets 11 and 12 together to maintain dimensional stability during subsequent handling and operations, and when the finished automotive part is ultimately painted and placed in the heat drying oven, then the adhesive 39 is activated to create a fixed securement of the sheets 11 and 12 together.

With respect to the creation of the projection weld, and referring to FIG. 4, in many of the known projection welding techniques the welding current applied to the electrode constitutes a sinusoidal alternating-current wave form as shown at 41 in FIG. 4, and most typically several cycles of the current wave form are applied to the electrode to effect a single projection weld. In use of the improved welding head and projection welding arrangement as disclosed in the aforesaid '122 patent, and as also depicted by FIG. 1, however, the electrode is subjected only to a very short duration, unipolar, high-intensity electrical current pulse 42 so as to effect a projection welding operation. Further, the control unit 23 preferably includes appropriate switching circuitry or switching software so that subsequent welding operations are of opposite polarity, for example the first weld being a unipolar pulse 42 as shown in FIG. 4, and the next or second weld being a similar pulse but of opposite polarity as indicated at 42'. The welding pulse which is used for each projection weld has a duration which occurs solely within a single half-cycle of the alternating-current wave form, and the duration of the current pulse such as pulse 42 is less than the time duration of the half wave form.

The specifics of the construction and operation of the welding arrangement 10 as briefly summarized above is explained in greater detail in the aforementioned '122 patent, and further detailed description thereof is believed unnecessary.

While projection welding and particularly hem-type projection welding using a pulse-type welding head of the aforementioned type has proven fairly successful and is gaining in commercial acceptability, nevertheless it has been observed that such arrangement still has less than optimum characteristics. For example, with this type of welding head, the spring which biases the electrode is normally in either a non-compressed or minimally compressed condition when the electrode is fully extended and, consequently, due to the significant variation in the spring rate characteristics in springs of this type, it has been observed that each welding head when subjected to an inward electrode depression and spring compression of a predetermined amount nevertheless results in significantly varying spring force magnitudes, and this in turn adversely effects the repeatability and dependability of the projection welds being produced. Further, with this arrangement the electrode typically has to be depressed through a significant distance, often in the order of three-fourths inch, and accordingly causes a corresponding large cycling stroke or compression of the spring, which in turn decreases the life of the spring. This long stroke also has been observed to, in some instances, result in the electrode being extended outwardly by this spring so as to contact and damage the copper support plate when the metal sheets are not present thereon, and this in turn can require that the copper support plate be repaired or replaced. The variability of the compressed force of the spring when under a normal load or compression condition, prior to actual initiation of the heating and compressing operation so as to effect welding, also has been observed to adversely effect the quality of the weld nugget being formed since an optimum weld nugget is formed by controlling and coordinating the magnitude of the electrical current peak in conjunction with the compression force imposed on the electrode by the spring, all in turn determined in conjunction with the thickness of the metal sheets and the size of the projection, so as to result in optimization of the heating and compression and collapsing of the projection so as to create the desired weld nugget.

It is thus an object of this invention to provide a welding arrangement, particularly a hem-type welding arrangement, the latter incorporating therein an improved welding head which is believed to represent an improvement over the prior arrangement, and which in particular is believed to improve upon the inconveniences and irregularities discussed above.

More specifically, in the improved welding arrangement of this invention, and particularly with respect to the improved welding head, the spring which biases the electrode is initially preloaded to always exert a significant biasing force on the electrode to maintain it against a stop to thus define the normal fully extended position of the electrode. In addition, the spring of the welding head is initially precalibrated so as to exert an accurate predetermined biasing force on the electrode when the electrode is depressed inwardly so as to effect compression of the spring by a predetermined distance, which latter distance is normally of very small magnitude so as to minimize the wear of the spring and optimize the responsiveness of the electrode movement. In this fashion, when the welding head is disposed in engagement with the overlapping sheets so that the electrode is engaged with the sheets in alignment with the projection, the electrode is depressed through said predetermined distance whereby a uniform predetermined biasing force is always applied to the electrode and hence to the projection weld area.

To achieve the improved welding gun of this invention as briefly summarized above, an electrode is initially depressed through said predetermined distance so as to effect compression of the spring and is maintained in this predetermined depressed state. A stop or support surface which engages one end of the spring is then adjusted axially along the welding gun so as to either increase or decrease the magnitude of the spring compression until the spring compression force, as applied to the depressed electrode, equals a predetermined value. The adjustable support surface is then fixed in this position, whereby the welding gun thus repeatedly reproduces an electrode-biasing force in the spring of said predetermined force whenever the electrode is depressed through said predetermined distance. In this fashion, multiple welding guns can be similarly calibrated so as to provide uniform projection welds.

A further object of the invention is to provide an improved process for projection welding, which process involves the steps of precalibrating the spring force of the welding gun so as to always provide a predetermined force acting on the electrode when the latter is depressed a predetermined distance, with the welding gun in its entirety then being moved toward one of the sheets to initially cause contact of the electrode against the sheet in general alignment with a projection formed on a second sheet, with the weld head being continually driven toward the metal sheets so as to cause the electrode to be depressed through said predetermined distance, this latter depression being limited by cooperating stops, one fixedly positioned and the other being associated with and moving in conjunction with the housing of the weld head. In this manner a precalibrated uniform force is always applied to the overlapping sheets at the projection and the electrode is always depressed substantially through said predetermined distance just prior to initiating the application of electrical current to the electrode.

Other objects and purposes of the invention will be apparent to persons familiar with structures and processes of this general type upon reading the following specification and inspecting the accompanying drawings.

BRIEF DESCRIPTION OF THE DRAWINGS

FIG. 2 illustrates, on an enlarged scale, a known hem-type projection welding arrangement, prior to creation of the projection weld.

FIG. 3 is a view corresponding to FIG. 2 but illustrating the arrangement after creation of the projection weld.

FIG. 11 is an enlarged front elevational view of the contact gun associated with the arrangement of FIG. 1.

FIG. 12 is a side elevational view of the contact gun shown in FIG. 11.

FIG. 13 is an enlarged fragmentary sectional view taken generally along line 13—13 in FIG. 12.

Figure 1:
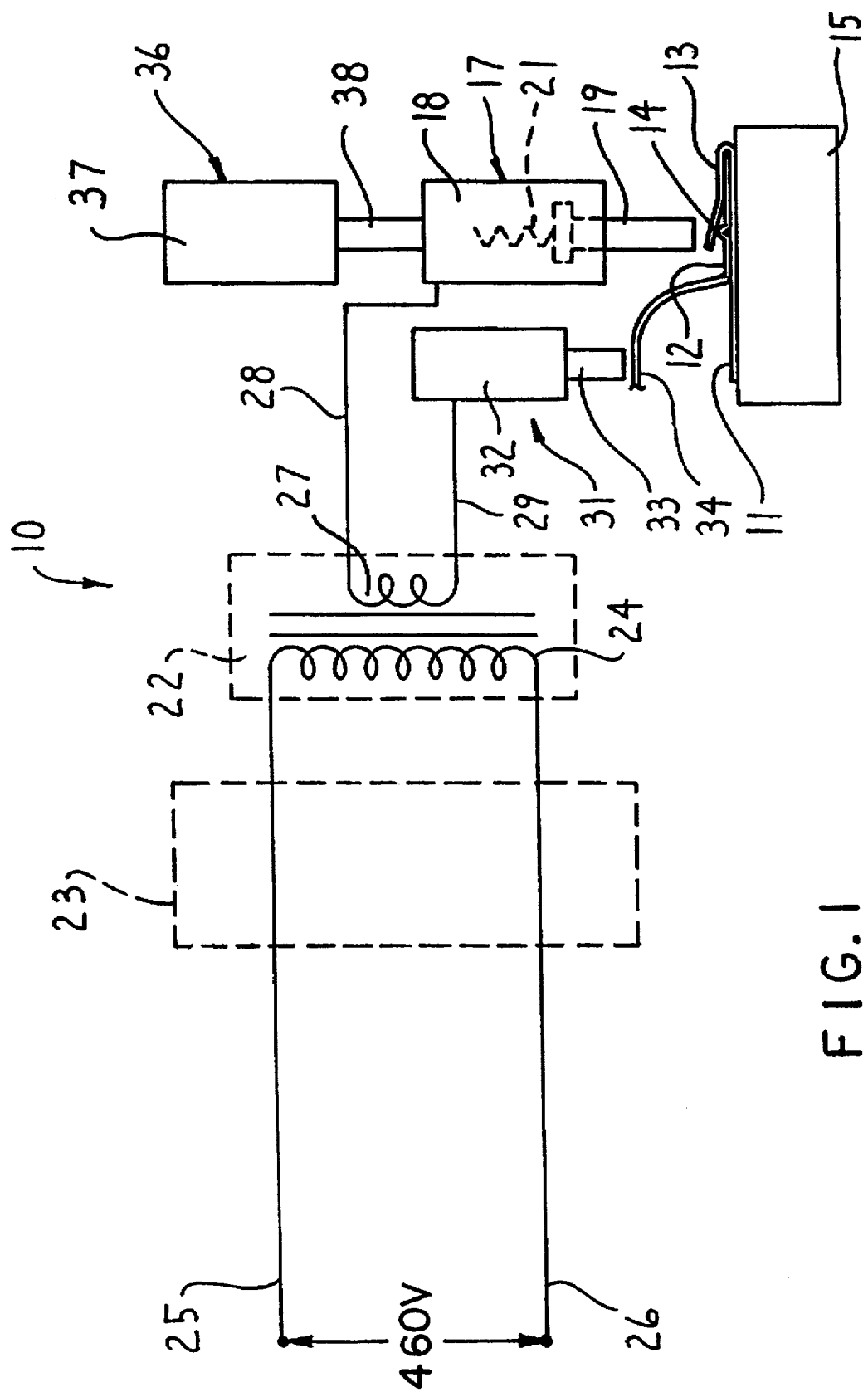
FIG. 1 diagrammatically illustrates a prior art projection welding arrangement, particularly a hem-type welding arrangement.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIGS. 5–8, there is illustrated an improved welding head assembly 17' according to the present invention. This welding head assembly 17', which includes an electrode assembly 19' movably supported on the housing 18', is particularly desirable for creation of a projection weld between two overlapping thin metal sheets and more specifically is particularly desirable for use in conjunction with a welding arrangement 10 as illustrated in FIG. 1 to permit creation of a projection weld of the type illustrated by FIGS. 2 and 3, with the welding head assembly being particularly suitable for application of a very short-duration unipolar current pulse created substantially as discussed above and as described in greater detail in the aforementioned '122 patent.

Figure 6:
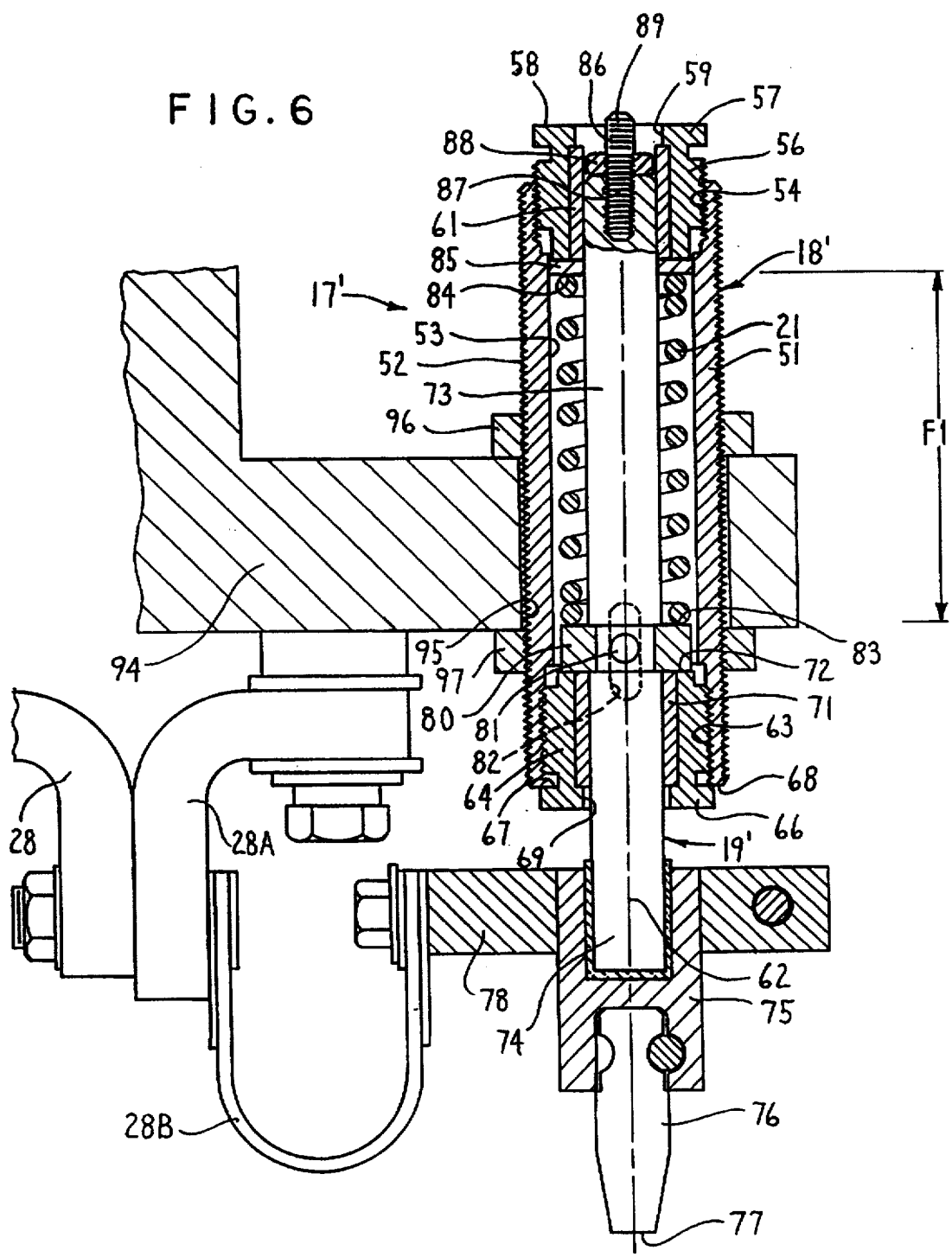
FIG. 6 is a longitudinal cross sectional view of the improved welding gun of this invention, same being illustrated with the electrode in its fully extended position.
Figure 7:
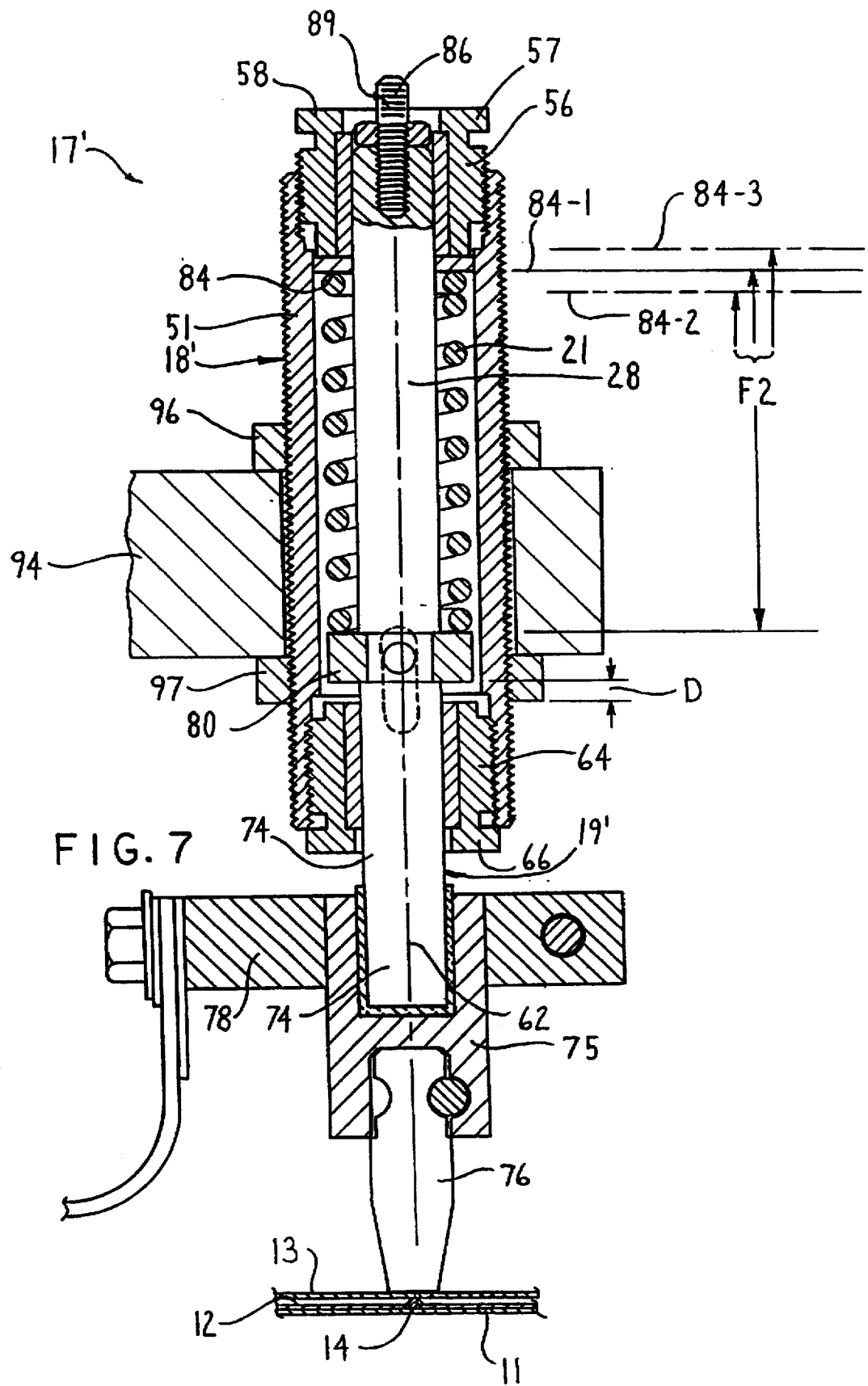
FIG. 7 is a view corresponding to FIG. 6 but illustrating the electrode in a condition wherein it is depressed by a predetermined distance and has been precalibrated so as to create a predetermined force within the spring whenever the electrode is depressed through said predetermined distance.

More specifically, the improved welding head assembly 17 of this invention and as illustrated in FIGS. 6–7 has the hollow housing 18' thereof defined by a generally elongate sleeve or casing 51 which is preferably externally threaded as indicated at 52. A bore or opening 53 extends throughout the length of the sleeve 51 generally in coaxial alignment along the longitudinal central axis 62 thereof. The bore 53 of sleeve 51 at its upper end is internally concentrically threaded at 54 so as to permit an adjustable stop or end member 56 to be threadably engaged therein. This end member 56, at its outer end, is provided with a drive flange 57 which is spaced outwardly from the end of the sleeve 51, and preferably defines thereon a generally flat end surface 58 which extends perpendicularly with respect to the longitudinal axis 62. The end member 56 also has a generally cylindrical opening 59 extending coaxially therethrough, and a sleeve-like annular bushing 61 is seated on the end member 56 within this latter opening.

The lower end of the sleeve bore or opening 53 is also internally threaded at 63, and mounts therein a lower stop or end member 64, the latter being engaged with the lower threads 63. This lower end member 64 at its outer end has an end flange 66 which projects radially outwardly and defines thereon an inner or upper surface 67 adapted to stationarily abut an end surface 68 defined on the lower end of the sleeve 51 to permit stationary fixed securement of the lower end member 64 into the sleeve 51 at a predetermined position relative thereto.

The lower end member 64 also has a cylindrical opening 69 extending coaxially therethrough, and a sleeve-like bushing 71 is also stationarily seated within this latter opening 69, the lower bushing 71 hence being coaxially aligned with the upper bushing 61. The lower end member 64 also defines thereon a generally flat upper atop surface 72 which is positioned generally within the interior of the hollow sleeve 51.

The electrode assembly 19' includes an elongate rod or shaft 73 which is positioned coaxially within the hollow housing 51 with opposite end portions of the shaft being slidably supported on the bushings 61 and 71. This shaft 73, herein referred to as the electrode support shaft, has the lower rod part 74 thereof positioned to project axially outwardly from one end of the housing 51, namely outwardly beyond the lower end member 64. This projecting rod part 74 stationarily mounts thereon an electrically conductive adaptor block 75, the latter being suitably electrically insulated from the shaft 73 through a conventional intermediate insulative material. This adaptor block 75 in turn has a coaxial opening projecting downwardly therefrom and into which an upper part of an elongate rodlike electrode 76 is positioned and is fixedly secured, as by a removable bolt. The electrode 76 is constructed of a strong but highly electrically conductive material such as copper or copper alloy as is conventional. The electrode 76 terminates in a lower end 77 which functions as the contact surface for the electrode. The adaptor block 75 is fixedly positioned within a surrounding electrically conductive split clamp 78, and the latter in turn is connected to one end of a flexible electrically-conductive lamination 28B which at its other end connects to a conductive element 28A mounted on the slide 93, which element 28A is electrically insulated from the slide 93. This conductive element 28A in turn connects to the conductor 28 associated with the secondary windings of the transformer. In this fashion the electrical pulse as supplied to the electrode 76 is supplied directly thereto through the clamp and adaptor block, and the housing 51 of the welding head assembly is insulated from the current supplied to the electrode.

A stop ring 80 surrounds and is fixedly secured to the electrode support shaft 73 at a location intermediate the ends thereof, with the stop ring 80 being nonrotatably and fixedly secured to the shaft in any suitable manner, such as by a transversely extending securing pin 81. This pin 81 in turn projects radially outwardly so as to be confined within an axially elongate groove 82 formed in the wall of the sleeve 51 so as to prevent rotation of the electrode assembly 19' relative to the sleeve 51 while at the same time permitting limited axial movement of the electrode assembly 19' relative to the sleeve. The stop ring 80 is positioned adjacent the lower end of the sleeve or housing so that a lower or bottom surface of the stop ring 80 is adapted to abuttingly contact the upper stop surface 72 defined on the lower end member 64, as illustrated in FIG. 6.

The spring 21, and specifically a coil spring, is positioned interiorly of the sleeve 51 in generally concentric and surrounding relationship to the electrode support shaft 73, and the lower end of this spring 21 is seated on an engagement surface 83 defined by the upper surface of the stop ring 80. The other or upper end of the spring 21 is seated on a further engagement surface 84, the latter being defined on the lower side of a suitable bearing plate or washer 85, the latter being positioned in surrounding relationship to the electrode shaft 73. This bearing washer 85 in turn is urged into contact with a lower surface of the upper end member 56. The spring 21 will normally maintain the electrode assembly 19' in a fully extended position substantially as illustrated by FIG. 6 when the electrode 76 is not subjected to an external force tending to effect depression or inward movement thereof.

The welding head assembly 17' of this invention and as illustrated in FIGS. 6 and 7 also has a visual indicator arrangement associated with the end thereof remote from the electrode so as to provide a visual indication of the electrode position, namely the nonoperative extended position of FIG. 6, or the contracted operative position of FIG. 7. This indicator, as illustrated in greater detail in FIG. 8, includes a visual indicator member 86 formed generally of an elongate rod and being coaxially threaded into a suitable threaded opening formed in the upper end of the electrode support shaft 73. The indicator rod 86 is sized so as to project upwardly beyond the shaft 73, and preferably upwardly at least a limited distance above the upper flat surface 58 of the adjustable stop or end member 56. The indicator rod 86 has a plurality of visual indicia 89 thereon, this in the illustrated embodiment being a plurality of generally parallel lines which are disposed in spaced relation along the axis of the welding head so that these lines can be positioned generally coplanar with the flat end surface 58 to provide a visual indication as to the axial position of the electrode assembly relative to the housing. The position of the visual indicator rod 86 can also be initially adjusted as desired, and for this purpose there is provided a lock nut 88 which is threadably engaged on the threaded lower part 87 of the indicator member. The lower threaded part 87 can be threaded into or backed out of the threaded opening in the shaft 73 to permit axial positioning of the indicator as desired, whereupon the lock nut 88 is then threaded downwardly on the lower threaded rod part 87 so as to abut the upper end of the shaft 73 to thus fixedly secure the indicator in the desired position.

Figure 5:
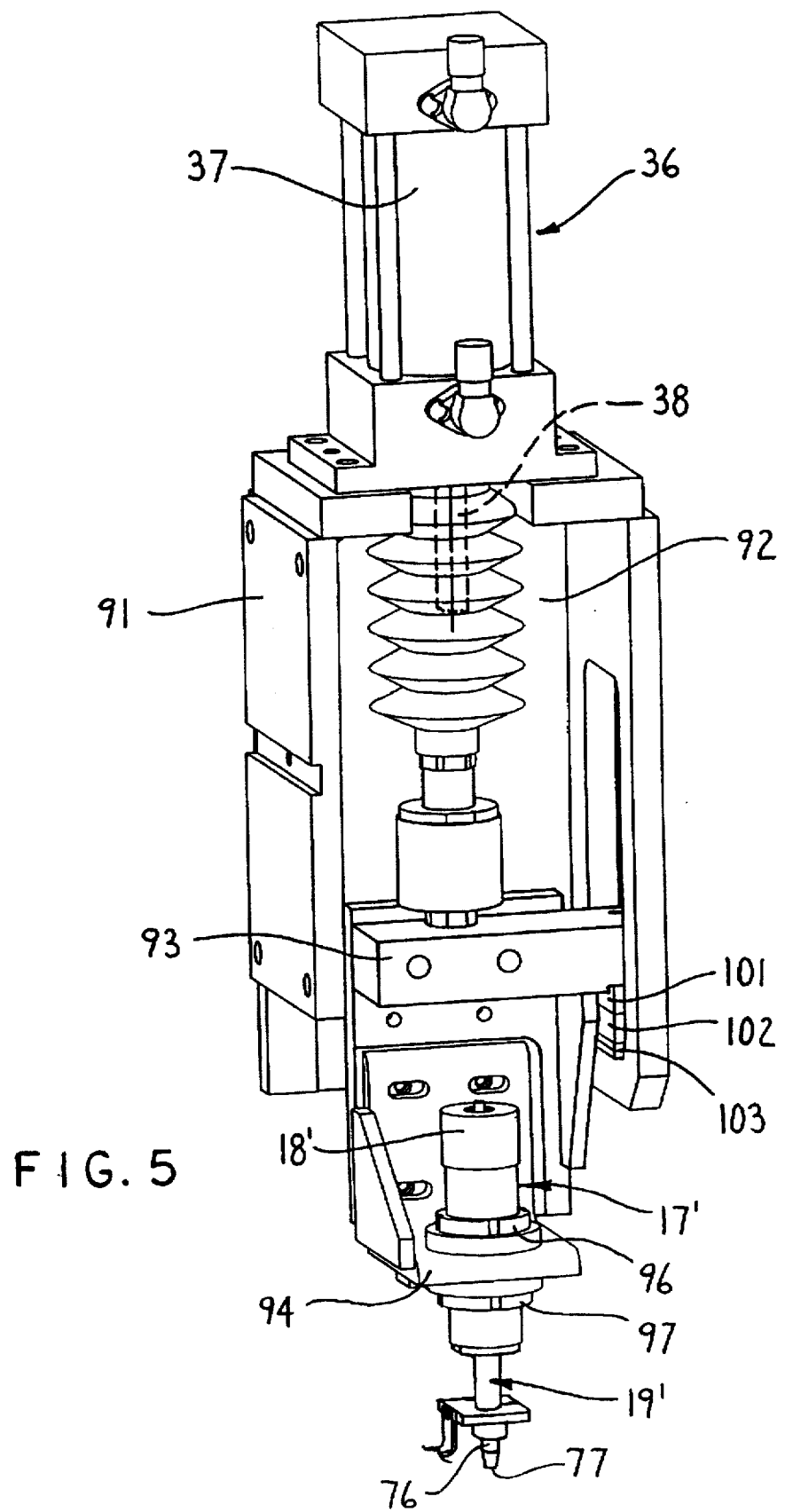
FIG. 5 is a perspective view which illustrates an improved welding gun or head according to the present invention, which gun is particularly desirable for applying a short-duration high-energy unipolar welding pulse to a projection welding structure, such as the structure illustrated in FIG. 2.

The welding head assembly 17 as illustrated by FIGS. 6 and 7 is, as shown in FIG. 5, movably supported on a suitable stationary frame 91, the latter in turn mounting thereon the housing 37 of the pressure cylinder 36. This frame 91 in turn slidably supports thereon a suitable head or slide member 93, the latter being connected to the extendable and contractible piston rod 38 associated with the drive device 36, the piston rod 38 in FIG. 5 being illustrated as enclosed within a suitable flexible bellows. This slidable head 93 in turn mounts thereon a support plate 94, the latter having an opening 95 extending therethrough in generally parallel relationship with the direction of movement of the piston rod 38. This opening 95 accommodates therein the housing or sleeve 51 of the weld head assembly 17' as illustrated in FIG. 6. The sleeve 51 preferably mounts thereon a pair of lock nuts 96 and 97, the latter being threadably engaged with the exterior threads on the sleeve 51, and being positioned on opposite sides of the plate 94. The position of the sleeve 51 of the weld head assembly 17 can thus be readily vertically adjusted relative to the plate 94, and then fixedly secured with respect to the plate by threading the lock nuts 96 and 97 along the sleeve so as to snugly clampingly engage opposite sides of the plate 94.

The welding head arrangement and drive arrangement, as illustrated by FIG. 5, also provide cooperating stops for controlling the movement of the weld head assembly. For this purpose, a first stop 101 is fixed to the movable head 93, and a further stop 102 is fixedly positioned relative to the frame 91, although the position of this latter stop 102 can be adjusted as desired, such as by any conventional adjustment structure such as shims 103. These stops 101 and 102, and specifically their position of engagement as illustrated by FIG. 5, is explained in greater detail hereinafter.

Considering now the specifics of the contact head assembly 31 and referring specifically to an improved construction thereof as illustrated in FIGS. 11–13, this contact head assembly includes an elongate rod-like electrode 111 which is secured to the lower end of a rod-like part (i.e. a piston rod) which is slidably supported on and projects outwardly from the housing 32 of a conventional fluid pressure cylinder such as a double-piston double-acting pneumatic cylinder. The electrode part or rod 111, at the lower free end thereof, has a cushioning or resilient element 112 secured thereto. This cushioning element 112 includes a support plate 113 having a block 114 of a resilient or elastomeric material fixed to the underside thereof. This resilient or elastomeric block 114 is preferably a rather stiff but yieldable elastomer such as polyurethane. The lower parallel edge corners of the block are preferably rounded as indicated at 115.

The cushioning element 112 is secured to the lower end of the electrode part 111 by a threaded fastener such as a screw 116, the latter being positioned within a stepped bore 117 which projects vertically downwardly along the electrode rod part. This screw 116 has the lower end thereof threadably engaged within a suitable threaded opening formed in the support plate 113 to thereby fixedly secure the cushioning element to the electrode rod.

The electrode assembly, in addition to the electrically conductive rod part 111, also includes an electrically conductive flexible strap 121, such as a strap formed of a braided or metal mesh, preferably a cooper braid or mesh. This flexible strap 121 is elongated so as to wrap around and snugly engage the bottom and opposite sides of the cushioning element 112 as illustrated in FIG. 13, with the strap having upper parts which also lie against and engage opposite side faces 122 of the electrode rod part 111. The upper portions of the strap 121, in the vicinity of the free ends thereof, are held against the side faces 122 by suitable clamping plates 123, and one or more suitable fasteners such as bolts 124 fixedly but removably secure the electrode strap 121 to the electrode part 111, with the cushioning element 112 being suitably provided so as to permit resilient cushioning between the bottom contact area defined by the strap 121 and the electrode rod part 111.

The improved electrical contact head arrangement of FIGS. 11–13 is the subject of a co-pending patent application filed concurrently herewith.

Figure 8:
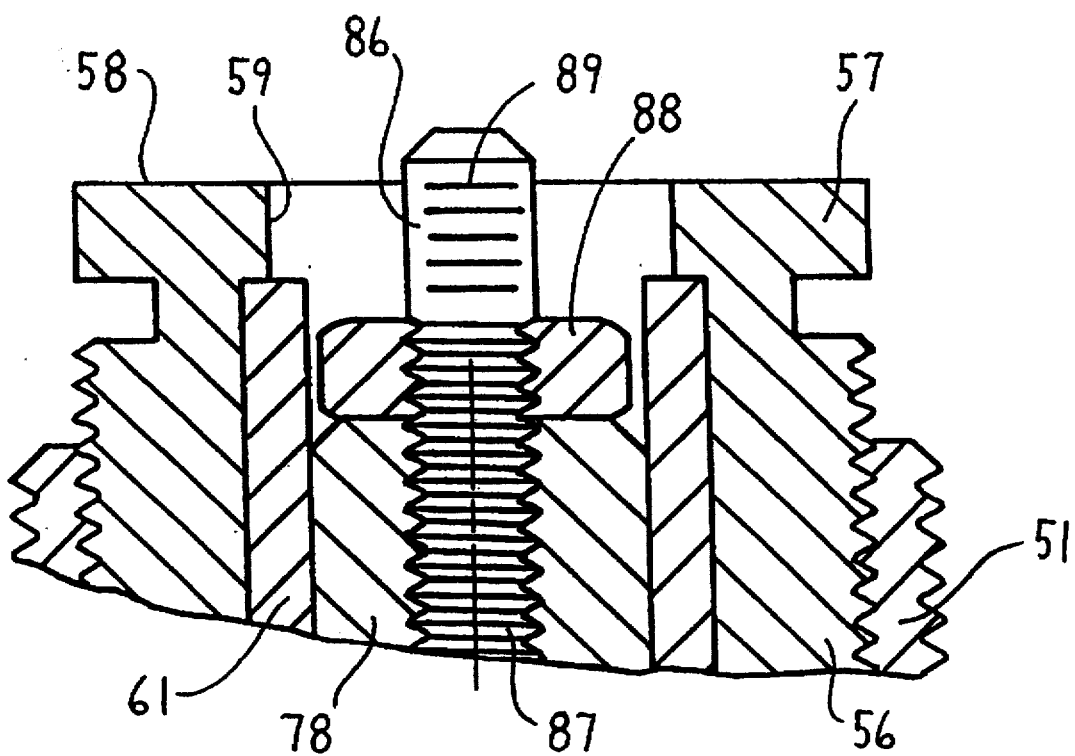
FIG. 8 is an enlarged fragmentary view illustrating the indicator structure provided on the upper end of the welding gun as shown in FIG. 6.
Figure 9:
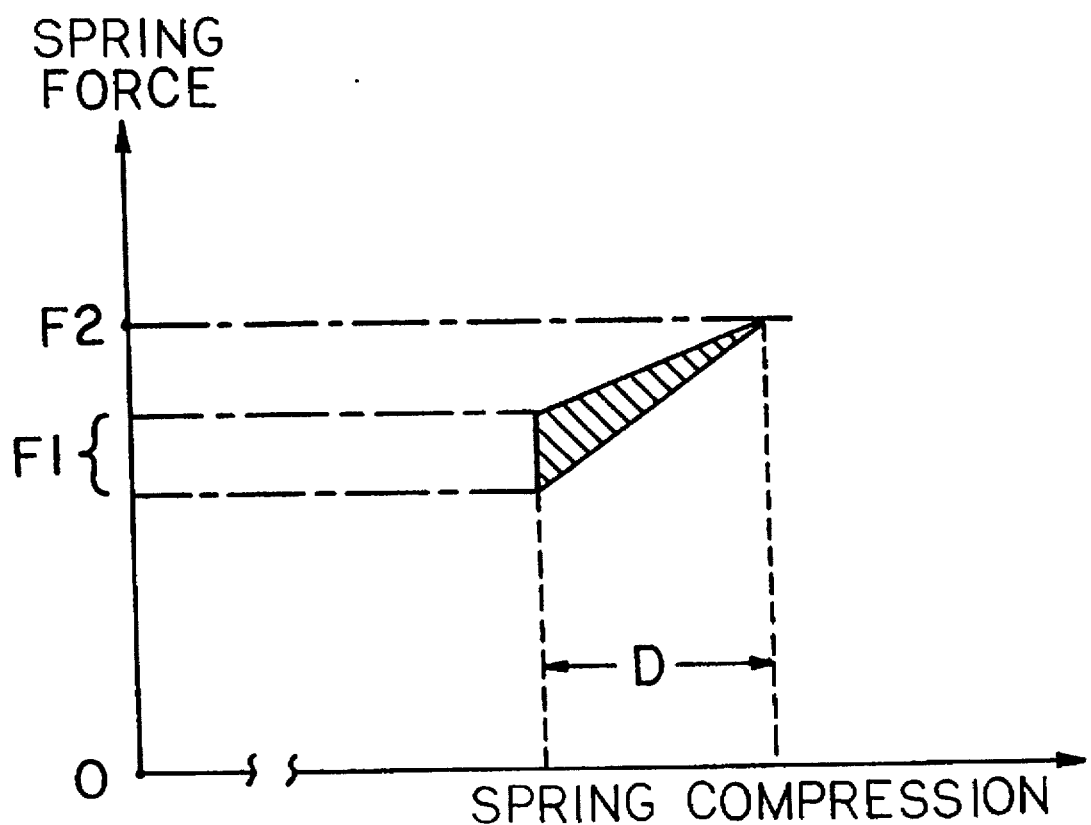
FIG. 9 diagrammatically illustrates the variation in force which typically exists when springs of the type used in welding guns are compressed through a predetermined distance, and particularly illustrates how this variation is controlled in the welding gun of the present invention so as to result in the spring imposing a predetermined uniform force on the electrode when the latter is depressed by the predetermined distance.

The operation of the welding arrangement for permitting projection welding, when incorporating therein the improved welding head assembly of the invention as illustrated by FIGS. 6–8, and the process associated with the precalibrating of the welding head assembly and the performance of the projection welding technique, will now be explained in conjunction with FIGS. 9 and 10.

To provide for a projection weld having the desired characteristics and to also permit the weld head assembly of the invention, particularly when multiple such weld heads are provided on an arrangement such as to permit simultaneous performance of multiple projection welds, to provide repeatable and uniform projection welds, it is desirable to be able to rather precisely control and predetermine the force applied to the projection weld at the initiation of the weld cycle. The improved weld head assembly of this invention, in contrast to prior weld heads, is able to achieve this highly desirable characteristic.

When the welding head assembly of this invention is in a fully assembled but non-operational (i.e., electrode fully extended) position as illustrated by FIGS. 1 and 6, the spring 21 is maintained under a condition of compression so that the spring hence maintains a substantial preload force F1 (FIG. 6) due to the confinement of the spring between the support surfaces 83 and 84, which preload force F1 maintains the electrode assembly 19' in the fully extended position due to the stop ring 80 abutting the inner stop surface 72. However, due to the significant variations which exist in coil springs, both dimensional variations and resulting variations in spring rate, the magnitude of the force F1 will vary from weld head assembly to weld head assembly even though the identical spacing or dimensional relationship between the surfaces 83 and 84 exists in all such assemblies. This variation in the preload force F1 may be a significant amount, and is diagrammatically illustrated in FIG. 9.

In addition to the variation in any preload force F1 as discussed above, the variation of the spring rate will also cause the spring force (designated F2 in FIG. 7) to vary under normal conditions when the electrode is depressed a predetermined distance into the housing, this predetermined distance in FIG. 7 being designated D. Under normal conditions, both the preload force F1 and the compressed force F2 are thus subject to significant variation and cannot be easily repeated in various welding head assemblies, and thus this introduces undesired variations in the projection welds created by different weld head assemblies.

In the improved weld head assembly of this invention, however, the upper end member 56 can be suitably adjusted relative to the housing 51 to permit adjustment in the spring force, and in fact is adjusted in a manner so as to permit the force F2 to be quite precisely set irrespective of overall tolerances or variations, and more specifically irrespective of spring tolerances and variations. In the welding head arrangement of this invention, the spring 21 is initially subjected to a pre-compression between the upper and lower end members, and thereafter the electrode assembly 19' is then displaced inwardly of the housing through a predetermined distance D. The electrode assembly is maintained in this predetermined inwardly displaced condition as illustrated by FIG. 7, and the upper end member 56 is then suitably adjusted by being threaded into or out of the sleeve 51 (as indicated by dotted lines in FIG. 7) to thus vary the compression force on the spring 21 until the compression force on the spring 21 equals the predetermined and desired magnitude F2. For this purpose, this precalibration is carried out on equipment suitable for sensing the compression force on the spring. After the end member 56 is adjusted into the desired position so as to represent the desired force F2 in the spring, then a suitable indicating device such as a paint stripe or the like can be applied at the overlapping thread area between the end member 56 and the sleeve 51 if desired so as to indicate the proper position thereof. The indicator 86 can also be threadably adjusted to the desired position, such as by aligning one of the lines 89 (for example the third line from the top) with the surface 58, since this thus provides a visual indication that the electrode assembly is displaced inwardly the predetermined distance D. Thereafter the external load is removed from the electrode assembly, and the spring 21 returns the electrode assembly into its fully extended position as indicated in FIG. 6, in which position the spring force now drops to the magnitude F1, which magnitude itself is variable due to spring characteristics, this variation being reflected by FIG. 9. However, the critical and repeatable force is the force F2 which exists when the electrode assembly is compressed through said predetermined distance D, as shown in FIG. 7, since it is this latter condition which exists at the point in time that the current is applied to the welding projection area.

Figure 10:
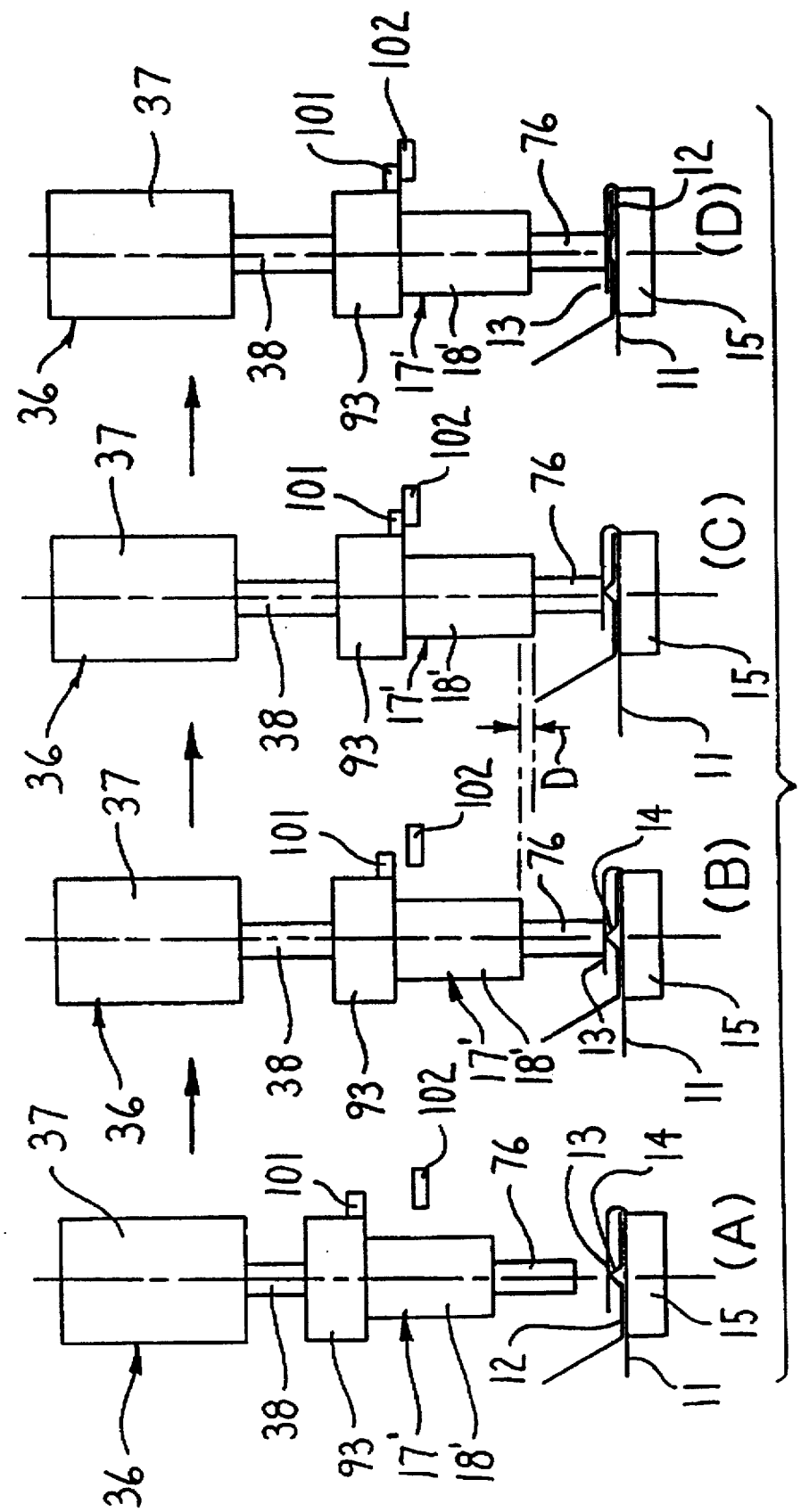
FIG. 10 diagrammatically illustrates the drive and welding gun arrangement of the present invention, and progressively illustrates the positional relationships associated with the parts thereof during the projection welding process, these various process positional relationships being diagrammatically and sequentially illustrated by the positions designated A through D.

Referring now to FIG. 10, position A illustrates the setup prior to initiation of the projection welding sequence. In position (A), the welding head is disposed with the electrode 76 fully extended, but spaced upwardly from the overlapping sheets. In this disposition, the moving stop 101 is also spaced upwardly from the stationary stop 102.

To initiate a projection welding sequence, the drive device 36 is energized so that piston rod 38 is extended and hence causes the welding head assembly 17', in its entirety to be moved downwardly until reaching position (B), in which position the lower free end of the electrode 76 contacts the upper sheet 13, and the latter is engaged with the projection 14. At the point of initial contact, however, the electrode 76 has not yet undergone any significant displacement or compression, and the moving stop 101 is now positioned closer but still spaced from the stationary stop 102.

Thereafter the drive device 36 continues to extend the piston 38 downwardly, which causes the housing 18' of the weld head assembly 17' to be moved downwardly through said distance D, at which time the stop 101 contacts the stop 102 and prevents further downward movement of the housing 18' of the weld head assembly. During downward movement through this distance D, however, the electrode 76 is already stationarily engaged with the workpiece sheets, and hence cannot move, and thus is effectively retracted or compressed upwardly into the weld head housing 18' through the distance D. As indicated by position (C) of FIG. 10, the weld head assembly is thus positioned generally as shown in FIG. 7, namely the electrode assembly is extended into the housing through the distance D, and thus the electrode 76 imposes on the overlapping workpieces, and on the projection, the precalibrated and predefined force F2.

Figure 4:
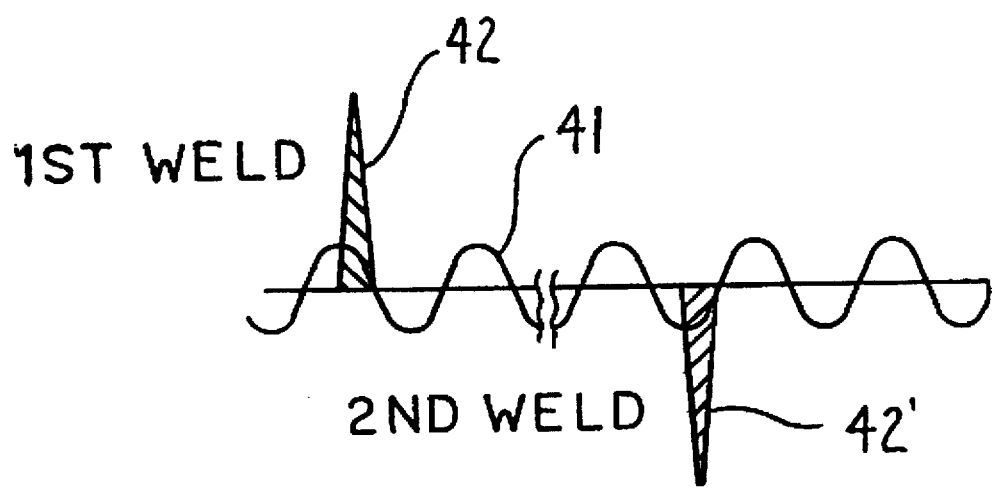
FIG. 4 illustrates a typical high energy welding pulse, in comparison to a conventional low-energy multiple-cycle welding pulse, both being known.

After reaching the position (C) indicated in FIG. 10, the control unit 23 is activated, through an appropriate sensor, so that a weld current such as a single short-duration unipolar weld pulse (such as the pulse 42 in FIG. 4) is supplied to the electrode 76, whereupon the current passes through the upper sheet 13 into the projection 14. Since in a hem welding operation the contact gun 31 is engaged with the part 34 of the sheet 12 as shown in FIG. 1, the current and the resulting heat can be effectively isolated from the lower sheet 11. The current pulse effects an immediate and localized heating particularly of the projection 14, and this in conjunction with the predetermined force F2, causes an immediate collapsing of the projection 14 to create a weld nugget between the parts 13 and 12. During this collapsing of the projection, the spring 21 and the rather high force F2 applied to the electrode 76 causes the electrode to immediately respond to and hence follow the collapsing of the projection so that the end contact surface of the electrode remains in contact with the sheet 13 so as to effect pressing together of the sheets 12 and 13 in the region of the collapsed projection 14. This follow-up movement of the electrode is further assisted by the fact that a rather high compression force in excess of preload force F1 is still applied to the electrode as the latter extends outwardly so as to effect compression of the projection, particularly since in many instances a full compression of the projection is not necessarily required, and thus the spring force acting on the electrode is maintained on the collapsed projection area until the welding head assembly is again retracted back toward the position (A) as shown in FIG. 10.

With the improved arrangement of this invention, the current pulse is preferably applied over part of a half wave alternating current cycle, about 40% to about 60% of the half wave, whereby the current pulse will normally have a short duration of between about three and six milliseconds.

While the welding head arrangement of this invention is particularly desirable for use with projection welding employing a short duration unipolar current pulse derived from a half wave of alternating current, it will be appreciated that the welding head assembly of this invention is also believed highly desirable for use in situations where the weld current may involve the application of two or more short duration weld pulses, which weld pulses may be of opposite plurality. Still further, the improved weld head assembly is also believed highly desirable for use in projection welding where the welding current may involve application of alternating current over a longer time period, such as application of current over a time period which is greater than a single wave form.

With the improved arrangement and process as summarized above, the stationary stop 102 will be suitably positionally adjusted so as to position it for engagement with the moving stop 101 at the point in time when the electrode is depressed or moved into the welding head housing through said predetermined distance D, substantially as illustrated in position (C) of FIG. 10, thereby insuring that the precalibrated or preset force F2 will always exist at the initiation of the actual weld operation (i.e., at the time the electrical weld pulse is applied) and thus permit multiple welding head assemblies to be precalibrated to thereby provide highly repeatable and dependable projection welds to be achieved. Further, with this improved arrangement, the compression distance D can itself be made significantly smaller than is conventional with projection welding heads, and in fact the distance D is preferably in the range of ⅛ to 3/16 inch (in comparison to a typical stroke of ¾ inch in many welding head assemblies). This very short electrode displacement, as measured from its fully extended position, thus significantly improves the fast response of the electrode during the actual projection collapsing phase, and itself provides for more uniformity of projection welds by not only permitting the precalibration of the predetermined initial welding force F2, but also insures that the welding force remains at a relatively high level or magnitude throughout the outward displacement of the electrode inasmuch as this force can never become less than the initial preload force F1, the latter also being of significant magnitude. In fact, it is preferred that this precompression or preload force F1 is typically at least about 50 percent of the precalibrated welding force F2, and preferably is at least 70 to 80 percent of the precalibrated welding force F2.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a projection welding arrangement for creating a projection weld between first and second overlapping thin metal sheets, wherein said first sheet has a generally flat first sheet part disposed in adjacent and overlapping relationship to a generally flat second sheet part as defined on said second sheet, said second sheet part having a projection therein which projects transversely towards said first sheet part for contact therewith, said arrangement comprising:

a workpiece support for supportive engagement with a side of one of said overlapping first and second sheet parts;

a welding gun assembly positioned opposite said workpiece support for creating a projection weld between said overlapping first and second sheet parts at said projection, said welding gun assembly including a body and a spring-urged electrode assembly movably mounted on said body and having a part projecting outwardly of said body and terminating in an electrode contact part which is disposed in opposed and adjacent relationship to an exterior side of said overlapping sheet parts which is opposite said workpiece support for contacting engagement with one of said sheet parts, said electrode contact part being generally aligned with said projection;

a power transformer having cooperating primary and secondary windings, first electrical conductor means for connecting said primary winding to a source of high-voltage alternating-current electrical energy, and second electrical conductor means connected between said secondary windings and said welding gun assembly for transmitting electrical energy to the electrode contact part of said welding gun assembly;

control means interposed with one of said first and second conductor means for permitting electrical energy to be supplied to the welding gun assembly for a single projection welding operation; and a drive device for effecting driving movement of said welding gun assembly between inoperative and operative positions, said welding gun assembly in said inoperative position being disposed with said electrode assembly fully extended from said body but maintained in spaced and non-engaged relation with said sheet parts, said welding gun assembly in said operative position being disposed with the electrode contact part in contacting engagement with one of said sheet parts;

the improvement comprising:

said welding gun assembly including a coil spring having opposite ends respectively engaged with first and second support surfaces for maintaining said spring in compressive engagement therebetween, one said support surface being mounted on said electrode assembly so that said spring normally urges said electrode assembly into a fully extended position wherein said electrode assembly abuts a stop surface provided on said body, the other said support surface being mounted on said body, and said first and second support surfaces being spaced apart by a distance to cause precompression of said spring when said electrode assembly is in said fully extended position, and adjustment means for adjusting the axial position of one of said support surfaces relative to said body to vary the compression of said spring, said adjustment means being adjusted to a calibration position to impose a predetermined compression force on said spring when said electrode assembly is depressed inwardly into said body into a predetermined depressed position wherein the electrode assembly is depressed inwardly said predetermined distance from said fully extended position.

2. An arrangement according to claim 1, wherein said adjustment means is defined by a support member threadably supported on said body for rotation about a longitudinal axis thereof to vary the position of the support member longitudinally along said body, said support member defining thereon said one support surface, said support member after adjustment in the calibration position being stationarily maintained relative to said body, said support member when in said calibration position cooperating with the other support surface to maintain the spring in a partially compressed condition even when the electrode assembly is in said fully extended position.

3. An arrangement according to claim 1, including stop means for controlling movement of said welding gun assembly by said drive means from said non-operative position to said operative position, said stop means including a first stop which is stationarily positioned relative to said workpiece support and a second stop which is stationarily positioned relative to and movable with said body, said second stop contacting said first stop when said welding gun assembly is in said operative position, said electrode assembly being engaged with one of said sheet parts and maintained in said predetermined depressed position when said welding gun assembly is in said operative position.

4. An arrangement according to claim 3, wherein the body of said welding gun assembly is adjustably positionable relative to said drive unit along the longitudinal direction thereof.

5. An arrangement according to claim 3, including visual indicator means provided on said welding gun assembly for indicating the fully extended and predetermined depressed positions of said electrode assembly.

6. An arrangement according to claim 1, wherein said body defines said stop surface adjacent one end thereof, said electrode assembly having an interior part which is longitudinally movably supported on said body and is positioned for contact with said stop surface when said electrode assembly is in said fully extended position, the contact part of said electrode assembly being longitudinally elongated and projecting outwardly from said one end of said body, said interior part of said electrode assembly defining thereon said first support surface with the latter being disposed in longitudinally spaced and opposing relationship to said second support surface as defined adjacent the other end of said body so that said spring is positioned concentric but generally concentrically of and extends longitudinally along said longitudinal axis between said first and second support surfaces, said adjustment means including a support member threadably engaged on said body at said other end thereof for adjustable movement of said support member longitudinally relative to said body, and means associated with said support member and defining thereon said second support surface.

7. An arrangement according to claim 6, wherein said body includes an end part which is provided at said one end of said body and defines said stop surface thereon, said end part and said support member having coaxially aligned openings formed therethrough along said longitudinal axis for slidable supportive engagement with said electrode assembly, said electrode assembly having a free end part which is slidably supported within said support member, and a visual indicator adjustably positioned on the free end part of said electrode assembly and projecting outwardly through the opening defined in said support member.

8. An arrangement according to claim 7, wherein the drive device includes a fluid pressure cylinder having a stationarily mounted housing and a piston rod movably supported thereon for movement generally along said longitudinal axis, and a slidable head connected to and slidably displaced by said piston rod, the body of said welding head assembly being longitudinally adjustably mounted on said slidable head.

9. An arrangement according to claim 1, wherein the spring is maintained under a first precompression force when the first support member has been moved into said calibration position and the welding gun assembly is in said inoperative position, and wherein the spring is maintained under a second precompression force when the welding gun assembly is maintained in said operative position wherein said electrode assembly is disposed in said predetermined depressed position, said first force having a magnitude which is at least about 50 percent of the magnitude of said second force.

10. In a hem projection welding arrangement for creating a projection weld between overlapping first and second thin metal sheets, wherein said first sheet has a generally first flat sheet part and a folded back hem part, and said second sheet has a generally second flat sheet part which is disposed between said first flat sheet part and said hem part, and said second flat sheet part has a projection thereon which projects transversely toward said hem part for contact therewith, said arrangement including:

a workpiece support for supportive engagement with an exterior side of said first flat sheet part which is opposite said second flat sheet part;

a welding gun assembly positioned opposite said workpiece support and including a hollow body and a spring-urged electrode assembly movably mounted within said hollow body and having an electrode part projecting outwardly of said body and terminating in a contact surface which is disposed in opposed and adjacent relationship to an exterior side of said hem part for contacting engagement therewith, said electrode part being generally aligned with said projection;

a contact gun assembly having an electrode positioned for contacting engagement with said second sheet at a location spaced from said projection;

a transformer having cooperating primary and secondary windings;

first conductor means for connecting the primary windings of said transformer to a conventional power line source of about 60 hertz alternating-current electrical energy;

second conductor means including first and second conductors connected between the secondary windings of said transformer and said welding gun assembly and said contact gun assembly, respectively;

control means interposed in said first conductor means for permitting a pulse of electrical energy of duration less than one cycle of said alternating current source to be supplied therethrough to the primary windings of said transformer for ultimate supply to the electrode part of said welding gun assembly; and a drive device for effecting driving movement of said welding gun assembly between inoperative and operative positions, said welding gun assembly in said inoperative position being disposed with said electrode assembly fully extended from said body but maintained in spaced and non-engaged relation with said hem part, said welding gun assembly in said operative position being disposed with said electrode part engaged with said hem part;

the improvement comprising:

said welding gun assembly including a coil spring having opposite ends respectively engaged with first and second support surfaces for maintaining said spring in compressive engagement therebetween, one said support surface being mounted on said electrode assembly so that said spring normally urges said electrode assembly into a fully extended position wherein said electrode assembly abuts a stop surface provided on said body, the other said support surface being mounted on said body, said first and second support surfaces being spaced apart by a distance to cause precompression of said spring when said electrode assembly is in said fully extended position, and adjustment means for adjusting the axial position of one of said support surfaces relative to said body to vary the compression of said spring, said adjustment means being adjusted to a calibration position to impose a predetermined compression force on said spring when said electrode assembly is depressed inwardly into said body a predetermined distance from said fully extended position.

11. An arrangement according to claim 10, wherein said adjustment means is defined by a support member threadably supported on said body for rotation about a longitudinal axis thereof to vary the position of the support member longitudinally along said body, said support member defining thereon said one support surface, said support member after adjustment in the calibration position being stationarily maintained relative to said body, said support member when in said calibration position cooperating with the other support surface to maintain the spring in a partially compressed condition even when the electrode assembly is in said fully extended position.

12. An arrangement according to claim 10, including stop means for controlling movement of said welding gun assembly by said drive means from said non-operative position to said operative position, said stop means including a first stop which is stationarily positioned relative to said workpiece support and a second stop which is stationarily positioned relative to and movable with said body, said second stop contacting said first stop when said welding gun assembly is in said operative position, said electrode part being engaged with one of said sheet parts and maintained in said predetermined depressed position when said welding gun assembly is in said operative position.

13. An arrangement according to claim 10, wherein the spring is maintained under a first precompression force when the first support member has been moved into said calibration position and the welding gun assembly is in said inoperative position, and wherein the spring is maintained under a second precompression force when the welding gun assembly is maintained in said operative position wherein said electrode assembly is disposed in said predetermined depressed position, said first force having a magnitude which is at least about 50 percent of the magnitude of said second force.

14. An arrangement according to claim 10, wherein said body defines said stop surface adjacent one end thereof, said electrode assembly having an interior part which is longitudinally movably supported on said body and is positioned for contact with said stop surface when said electrode is in said fully extended position, the contact part of said electrode assembly being longitudinally elongated and projecting outwardly from said one end of said body, said interior part of said electrode assembly defining thereon said first support surface with the latter being disposed in longitudinally spaced and opposing relationship to said second support surface as defined adjacent the other end of said body so that said spring is positioned concentric but generally concentrically of and extends longitudinally along said longitudinal axis between said first and second support surfaces, said adjustment means including a support member threadably engaged on said body at said other end thereof for adjustable movement of said support member longitudinally relative to said body, and means associated with said support member and defining thereon said second support surface.

15. A process for calibrating and moving a welding gun for projection welding of overlapping first and second thin metal sheet parts with said second sheet part having a small projection formed therein and projecting transversely toward and into contact with said first sheet part, said welding gun including a body containing an electrode assembly movably supported thereon and a spring acting on said electrode assembly and urging the electrode assembly outwardly so that a projecting part of said electrode assembly projects outwardly of said body when said electrode assembly is biased by said spring into a fully extended position, comprising the steps of:

(1) precalibrating said welding gun by (a) axially captivating said spring between first and second support surfaces, said first support surface being mounted on one of said electrode assembly and said body, said second support surface being mounted on the other of said electrode assembly and said body, (b) displacing said first support surface toward said second support surface through a small predetermined distance substantially corresponding to a desired projection welding stroke to effect compression of said spring, (c) adjustably moving one of said support surfaces toward or away from the other support surface until the compression force on said spring equals a predetermined magnitude, (d) fixing said one support surface in position relative to the other support surface to maintain the compression of said spring at said predetermined magnitude, and (e) thereafter moving said first support surface away from said second support surface through said predetermined distance to permit at least partial expansion of said spring;

(2) positioning said welding gun in a first position in opposed relationship to a workpiece support so that the electrode assembly is in its fully extended position and the projecting part of said electrode assembly is spaced from said workpiece support by a selected distance which is greater than said predetermined distance;

(3) positioning said first and second sheet parts on said workpiece support in at least partial overlapping relationship so that the overlapping sheet parts are spaced from the projecting part of the electrode assembly but the projection is substantially aligned with said projecting part of said electrode assembly;

(4) moving said welding gun toward said workpiece support until the projecting part of said electrode assembly contacts an adjacent one of said overlapping sheet parts in approximately aligned relation with said projection, and said projection on said second sheet part is in contact with said first sheet part;

(5) continuing to move the body of said welding gun toward the workpiece support until reaching an operative position wherein the projecting part of the electrode assembly is depressed into the body through said predetermined distance so that the electrode assembly applies a force of substantially said predetermined magnitude against said one sheet part;

(6) thereafter applying an electrical current to said projecting part of said electrode assembly and passing this current into said sheets and said projection to effect localized heating thereof;

(7) maintaining the application of force of said predetermined magnitude on said one sheet by said electrode assembly during the aforementioned localized heating;

(8) causing the electrode assembly to be extended outwardly toward the workpiece support under the urging of the spring to cause at least partial collapse of the projection to create a projection weld between the overlapping sheet parts at the location of the projection.

16. A process according to claim 15, including the steps of:

providing a first stop in fixed relation to said welding gun body and a second stop in fixed relation to said workpiece support, said first and second stops being spaced apart when said welding gun is in said inoperative position; and moving said first stop into contact with said second stop when the body of said welding gun is moved into said operative position.

17. A process according to claim 15, wherein the current applied to the electrode part is a pulse of a duration less than one-half of an alternating-current wave cycle supplied from a standard alternating-current electrical power supply.

18. A process according to claim 15, including forming on said first sheet a sheet-like flange part which is folded back to generally overlie but is spaced from said first sheet-like part, positioning said first sheet on said workpiece support so that said first sheet-like part is directly supportingly engaged on said workpiece support and said flange part is spaced therefrom, and positioning said second sheet-like part in generally sandwiched relation between said first sheet part and said flange part so that said projection projects transversely toward said flange part for contact therewith, and thereafter moving said welding gun toward said workpiece support so that the projecting electrode part thereof moves into contact directly with said flange part.

19. A process according to claim 15, wherein the precalibrating step also includes the step of maintaining the spring under a compression force of predetermined value when the one support surface is in said precalibration position and said electrode assembly is in said fully extended position, and said compression force of said predetermined value being at least about 50 percent of said compression force of said predetermined magnitude.

* * * * *